(12) United States Patent  
Sekiguchi

(10) Patent No.: US 10,318,132 B2
(45) Date of Patent: Jun. 11, 2019

(54) DISPLAY DEVICE AND DISPLAY METHOD

(71) Applicant: KYOCERA Document Solutions Inc., Osaka (JP)

(72) Inventor: Yasuhiro Sekiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 44 days.

(21) Appl. No.: 15/602,209

(22) Filed: May 23, 2017

(65) Prior Publication Data

US 2017/0344235 A1 Nov. 30, 2017

(30) Foreign Application Priority Data

May 27, 2016 (JP) .................................. 2016-106046

(51) Int. Cl.
*G06F 3/0481* (2013.01)
*G06F 3/0484* (2013.01)
*G06F 3/0488* (2013.01)

(52) U.S. Cl.
CPC ........ *G06F 3/04845* (2013.01); *G06F 3/0484* (2013.01); *G06F 3/0488* (2013.01); *G06F 3/04817* (2013.01); *G06F 3/04883* (2013.01)

(58) Field of Classification Search
CPC .............................. G06F 3/0481; G06F 9/451
See application file for complete search history.

(56) References Cited

U.S. PATENT DOCUMENTS

| 5,227,771 A * | 7/1993 | Kerr ...................... G06F 3/0481 345/157 |
| 6,501,487 B1 * | 12/2002 | Taguchi ................ G06F 3/0481 715/788 |
| 7,263,670 B2 | 8/2007 | Rekimoto |
| 9,195,382 B2 | 11/2015 | Kuscher et al. |
| 10,048,847 B2 | 8/2018 | Kuscher et al. |
| 2003/0223182 A1 * | 12/2003 | Yurugi .................. G06F 1/1616 361/679.55 |
| 2005/0060665 A1 | 3/2005 | Rekimoto |

(Continued)

FOREIGN PATENT DOCUMENTS

| JP | 2000-293287 A | 10/2000 |
| JP | 2005-004396 A | 1/2005 |

(Continued)

OTHER PUBLICATIONS

An Office Action mailed by the Japanese Patent Office dated Dec. 18, 2018, which corresponds to Japanese Patent Application No. 2016-106046 and is related to U.S. Appl. No. 15/602,209.

(Continued)

*Primary Examiner* — Justin S Lee

(74) *Attorney, Agent, or Firm* — Studebaker & Brackett PC

(57) ABSTRACT

A display device includes a display section, a touch panel, and a controller. The display section displays a first icon. The touch panel detects a first touch operation and a second touch operation different from the first touch operation to the first icon. The controller causes the display section to display a window associated with the first icon upon detection of either of the first and second touch operations. The controller controls the display section such that a window displayed upon detection of the second touch operation is different in size from a window displayed upon detection of the first touch operation.

10 Claims, 7 Drawing Sheets

(56) References Cited

U.S. PATENT DOCUMENTS

| | | | |
|---|---|---|---|
| 2008/0052637 A1* | 2/2008 | Ben-Yoseph | G06F 3/0481 715/800 |
| 2008/0184160 A1* | 7/2008 | Chang | G06F 3/0481 715/781 |
| 2009/0235203 A1* | 9/2009 | Iizuka | G06F 3/0481 715/800 |
| 2009/0315867 A1* | 12/2009 | Sakamoto | G06F 3/03547 345/184 |
| 2010/0088634 A1* | 4/2010 | Tsuruta | G06F 3/0481 715/800 |
| 2014/0101603 A1* | 4/2014 | Kawaguchi | G06F 3/0481 715/790 |
| 2014/0215387 A1 | 7/2014 | Kuscher et al. | |
| 2016/0041744 A1 | 2/2016 | Kuscher et al. | |
| 2017/0052674 A1* | 2/2017 | Tokutake | G06F 3/04817 |

FOREIGN PATENT DOCUMENTS

| | | |
|---|---|---|
| JP | 2009-217842 A | 9/2009 |
| JP | 2015-032091 A | 2/2015 |
| JP | 2016-509724 A | 3/2016 |

OTHER PUBLICATIONS

An Office Action mailed by the Japanese Patent Office dated Feb. 26, 2019, which corresponds to Japanese Patent Application No. 2016-106046 and is related to U.S. Appl. No. 15/602,209; with English translation.

* cited by examiner

DISPLAY DEVICE AND DISPLAY METHOD

INCORPORATION BY REFERENCE

The present application claims priority under 35 U.S.C. § 119 to Japanese Patent Application No. 2016-106046, filed on May 27, 2016. The contents of this application are incorporated herein by reference in their entirety.

BACKGROUND

The present disclosure relates to a display device and a display method.

In some window display control device, when a cursor is positioned at any point within a window that is data on a display screen using a mouse, an object located at the point is specified as a size change target. During a continuous operation of pressing a left or right button of the mouse, size change is performed by which the specified object is gradually zoomed in or out with time of the continuous operation.

SUMMARY

According to a first aspect of the present disclosure, a display device includes a display section, a detection section, and a controller. The display section displays a first icon. The detection section detects a first touch operation and a second touch operation different from the first touch operation to the first icon. The controller causes the display section to display a window associated with the first icon upon detection of either of the first and second touch operations. The controller controls the display section such that a window displayed upon detection of the second touch operation is different in size from a window displayed upon detection of the first touch operation.

According to a second aspect of the present disclosure, a display method is implemented by a display device including a display section. The display method includes: displaying a first icon; detecting a first touch operation and a second touch operation different from the first touch operation to the first icon; and causing the display section to display a window associated with the first icon upon detection of either of the first and second touch operations. A window displayed upon detection of the second touch operation is different in size from a window displayed upon detection of the first touch operation.

DETAILED DESCRIPTION

Figure 1:
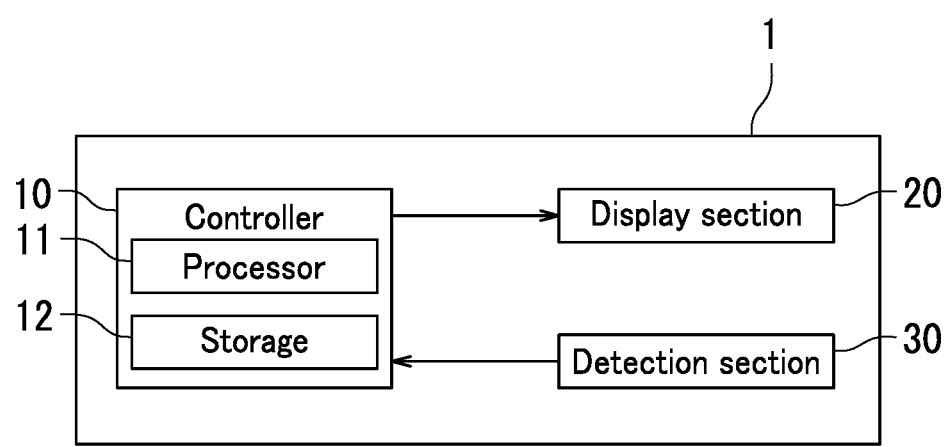
FIG. 1 illustrates a display device according to an embodiment of the present disclosure.

The following describes an embodiment of the present disclosure with reference to the drawings. Elements that are the same or equivalent are marked using the same reference signs in the drawings and explanation thereof is not repeated.

Figure 2A:
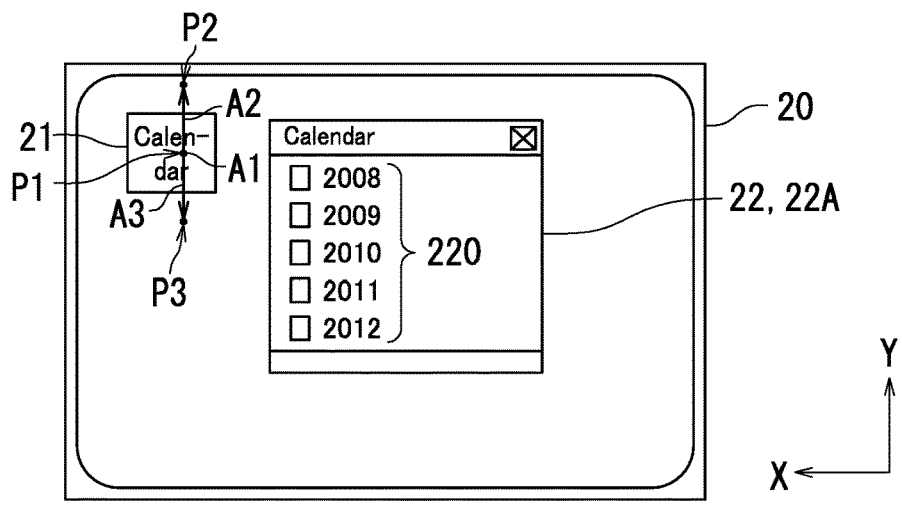
FIGS. 2A-2C illustrate first window display control that the display device according to the embodiment of the present disclosure executes.
Figure 2B:
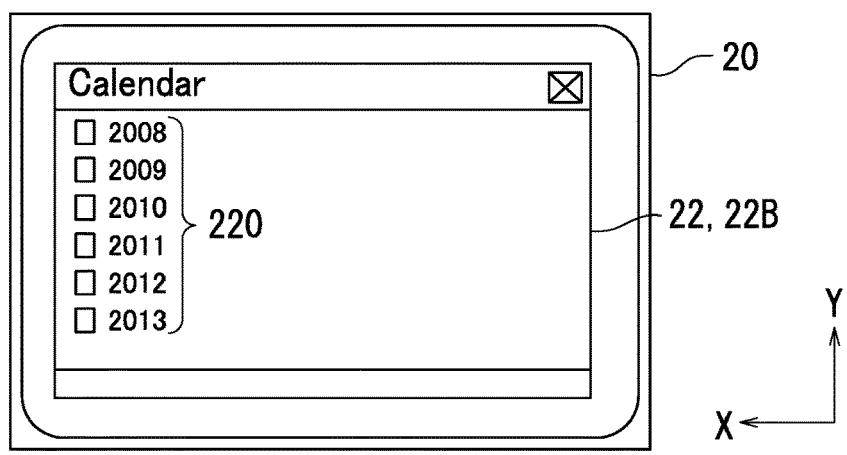
Figure 2C:
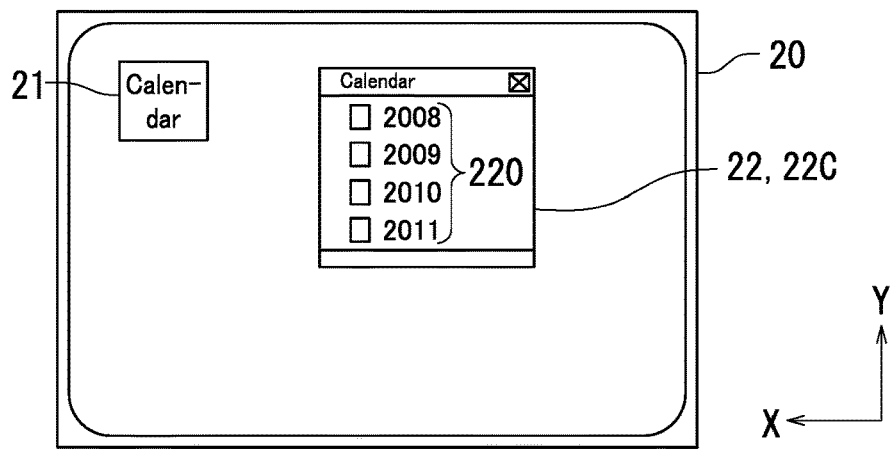

With reference to FIGS. 1, 2A, and 2B, a display device 1 according to an embodiment of the present disclosure will be described. FIG. 1 illustrates the display device 1. FIGS. 2A-2C illustrate window display control that the display device 1 executes. As illustrated in FIG. 1, the display device 1 includes a controller 10, a display section 20, and a touch panel 30 that is a detection section. As illustrated in FIG. 2A, the display section 20 displays a first icon 21. A window 22 is associated with the first icon 21.

The touch panel 30 detects a first touch operation A1 and a second touch operation A2 to the first icon 21. The second touch operation A2 is different from the first touch operation A1. The controller 10 causes the display section 20 to display the window 22 upon detection of either of the first and second touch operations A1 and A2. The controller 10 causes the display section 20 to display the window 22 such that the window displayed 22 upon detection of the second touch operation A2 is different in size from the window 22 displayed upon detection of the first touch operation A1.

Specifically, the controller 10 causes the display section 20 to display a window 22 (22A) illustrated in FIG. 2A upon detection of the first touch operation A1 and display a window 22 (22B) illustrated in FIG. 2B upon detection of the second touch operation A2. The window 22 (22A) illustrated in FIG. 2A is different in size from the window 22 (22B) illustrated in FIG. 2B.

As described with reference to FIGS. 1, 2A, and 2B, the display section 20 is controlled such that the window 22 (22B) displayed upon detection of the second touch operation A2 is different in size from the window 22 (22A) displayed upon detection of the first touch operation A1 in the present embodiment. In the above configuration, a user of the display device 1 can cause the display section 20 to display the window 22 while setting the size of the window 22. As a result, a burden on the user can be reduced in causing the display section 20 to display the window 22. The display device 1 will be described below in detail with reference to FIGS. 1-7.

First window display control that the display device 1 executes will be described first with reference to FIGS. 1 and 2A-2C. The controller 10 is constituted by for example a storage 12 such as a memory, computer programs (programs), and a processor 11 such as a central processing unit (CPU), a micro processing unit (MPU), or an application specific integrated circuit (ASIC). The processor 11 of the controller 10 controls the display section 20 and the touch panel 30 through execution of the computer programs stored in the storage 12. The display section 20 is for example a liquid-crystal display. An X axis in each drawing is parallel to long sides of the display section 20. A Y axis therein is parallel to short sides of the display section 20. A travel amount of a detection target traveling on the display section 20 is a Y component of a travel vector in the following description.

For example, a folder or a piece of application software is associated with the first icon 21. A folder is associated with the first icon 21 in the present embodiment. At least one second icon 220 is associated with the folder. The name of the folder associated with the first icon 21 is "Calendar" in the present embodiment. Six second icons 220 are associated with the folder of which name is "Calendar".

The first touch operation A1 to the first icon 21 includes a touch of the detection target to the first icon 21 followed by separation thereof from the first icon 21. A touch of the detection target to the first icon 21 refers to a touch of the detection target in a region in the display section 20 that is coincident with the first icon 21. Further, separation of the detection target from the first icon 21 refers to separation of the detection target touching the region in the display section 20 that is coincident with the first icon 21 from the display section 20. The detection target is for example a finger of a user of the display device 1 or a stylus. A travel amount of the detection target on the display section 20 from a touch to the first icon 21 to separation therefrom in the first touch operation A1 is no greater than a threshold value. The user can set the threshold value at any value. The first touch operation A1 is for example a tapping.

The controller 10 causes the display section 20 to display the window 22 illustrated in FIG. 2A upon detection of the first touch operation A1 to the first icon 21. The window 22 displayed upon detection of the first touch operation A1 may be also referred to below as a window 22A. The window 22A has a preset size set in advance. The size of the window 22 herein refers to an area, a diagonal length, or the number of pixels of the window 22. The display section 20 displays the window 22A such that five second icons 220 among the six second icons 220 associated with the folder of which folder name is "Calendar" are included in the window 22A.

The second touch operation A2 to the first icon 21 includes a touch of the detection target to the first icon 21 followed by separation thereof from the first icon 21 and travel thereof on the display section 20 in a first direction starting from the first icon 21 as a starting point. The first direction is a positive Y direction in the present embodiment. A starting position P1 of the second touch operation A2 is located within a region of the display section 20 that is coincident with the first icon 21. The starting position P1 of the second touch operation A2 may be referred to simply as a starting point in the present specification. Examples of the second touch operation A2 include a flicking, a sliding, a scrolling, and a swiping.

The controller 10 causes the display section 20 to display the window 22 illustrated in FIG. 2B upon detection of the second touch operation A2 to the first icon 21. The window 22 displayed upon detection of the second touch operation A2 may be also referred to below as a window 22B. The controller 10 controls the display section 20 such that the window 22B is larger in size than the window 22A. That is, the size of the window 22B is larger than that of the window 22A. The display section 20 displays the window 22B such that all of the six second icons 220 associated with the folder of which folder name is "Calendar" are included in the window 22B.

The touch panel 30 detects a third touch operation A3 to the first icon 21. The third touch operation A3 to the first icon 21 includes a touch of the detection target to the first icon 21 followed by separation thereof from the first icon 21 and travel thereof on the display section 20 in a second direction starting from the first icon 21 as a starting point. The second direction is different from the first direction. The second direction is a negative Y direction in the present embodiment. A starting position P1 of the third touch operation A3 is located within a region of the display section 20 that is coincident with the first icon 21. The third touch operation A3 is different from the first and second touch operations A1 and A2. Examples of the third touch operation A3 include a flicking, a sliding, a scrolling, and a swiping.

The controller 10 causes the display section 20 to display a window 22 illustrated in FIG. 2C upon detection of the third touch operation A3 to the first icon 21. The window 22 displayed upon detection of the third touch operation A3 may be also referred to below as a window 22C. The controller 10 controls the display section 20 such that the window 22C is smaller in size than the window 22A. That is, the size of the window 22C is smaller than that of the window 22A. Furthermore, the size of the window 22C is smaller than that of the window 22B. The display section 20 displays the window 22C such that four second icons 220 among the six second icons 220 associated with the folder of which folder name is "Calendar" are included in the window 22C.

As described with reference to FIGS. 1 and 2A-2C, the display section 20 is controlled such that the window 22B displayed upon detection of the second touch operation A2 is larger in size than the window 22A displayed upon detection of the first touch operation A1 in the present embodiment. In the above configuration, the user of the display device 1 can cause the display section 20 to display the window 22B larger in size than the preset size only by moving the detection target on the display section 20 in the first direction after touching the first icon 21. The user can accordingly cause the window 22 to be displayed on the display section 20 while setting the size of the window 22, thereby achieving reduction in a burden on the user in causing the display section 20 to display the window 22.

Furthermore, the window 22B is larger in size than the window 22A in the present embodiment. In the above configuration, when the window 22B is displayed on the display section 20, the user can recognize more second icons 220 than those displayed when the window 22A is displayed on the display section 20. As a result, impairment of recognizability of the second icons 220 can be prevented while a burden on the user can be reduced in causing the display section 20 to display the window 22.

In addition, the display section 20 is controlled such that the window 22C displayed upon detection of the third touch operation A3 is smaller in size than the window 22A displayed upon detection of the first touch operation A1 in the present embodiment. In the above configuration, the user of the display device 1 can cause the display section 20 to display the window 22C in a size smaller than the preset size only by moving the detection target in the second direction. As a result, a burden on the user can be reduced in causing the display section 20 to display the window 22.

Furthermore, the window 22C is smaller in size than the window 22A in the present embodiment. In the above configuration, an area of the display section 20 that is occupied by the window 22C in displaying the window 22C on the display section 20 can be reduced when compared with that occupied by the window 22A in displaying the window 22A on the display section 20. As a result, impairment of recognizability of the display section 20 can be prevented.

Figure 3:
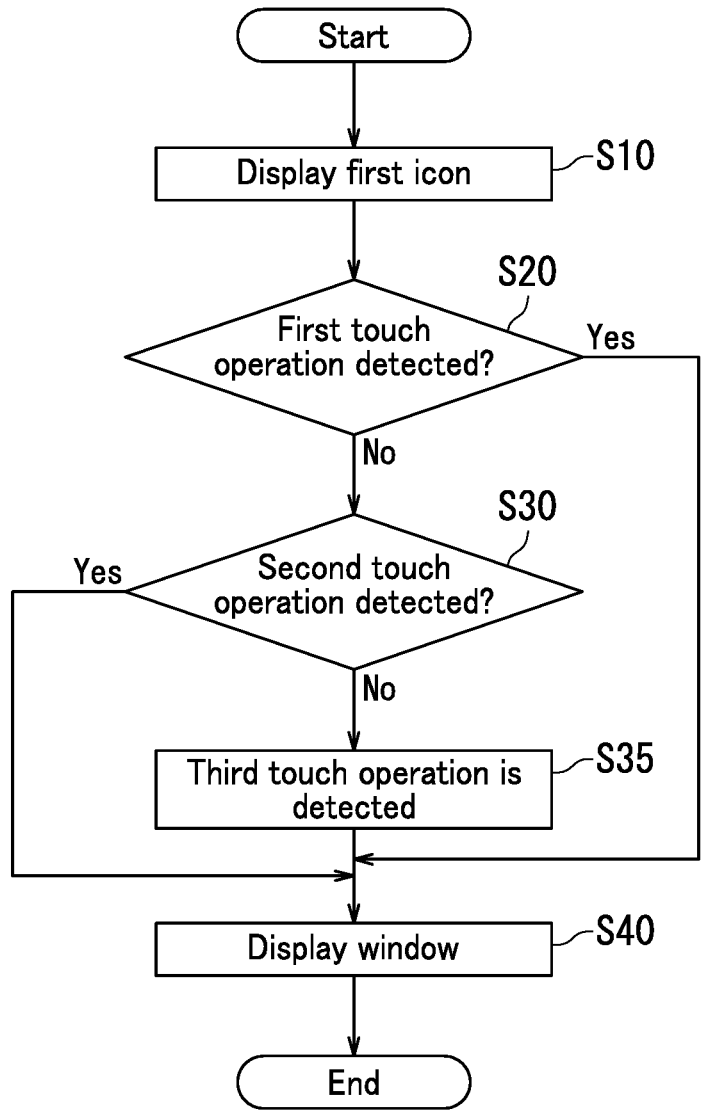
FIG. 3 is a flowchart depicting a first window display control that the display device according to the embodiment of the present disclosure executes.

Description will be made next with reference to FIGS. 1-3 about a window display method that the display device 1 implements. FIG. 3 is a flowchart depicting the window display method that the display device 1 implements. The display device 1 causes the display section 20 to display the window 22 through execution of Steps S10 to S40.

At Step S10, the display section 20 displays the first icon 21. At Step S20, the touch panel 30 detects the first, second, or third touch operation A1, A2, or A3 to the first icon 21. The second touch operation A2 is different from the first touch operation A1. The third touch operation A3 is also different from the first touch operation A1. Further, the second touch operation A2 is different from the third touch operation A3. The controller 10 determines whether or not the touch panel 30 detects the first touch operation A1.

When the controller 10 makes positive determination (YES) at Step S20, that is, when the controller 10 determines that the touch panel 30 detects the first touch operation A1, the routine proceeds to Step S40. By contrast, when the controller 10 makes negative determination (NO) at Step S20, the routine proceeds to Step S30. At Step S30, the controller 10 determines whether or not the touch panel 30 detects the second touch operation A2. When the controller 10 makes positive determination (YES) at Step S30, that is, when the controller 10 determines that the touch panel 30 detects the second touch operation A2, the routine proceeds to Step S40. By contrast, when the controller 10 makes negative determination (NO) at Step S30, the routine proceeds to Step S35. At Step S35, the controller 10 determines that the touch panel 30 detects the third touch operation A3.

At Step S40, the controller 10 causes the display section 20 to display a window 22 associated with the first icon 21 upon detection of any one of the first, second, and third touch operation A1, A2, and A3. Specifically, once it is determined at Step S20 that the first touch operation A1 is detected, the controller 10 causes the display section 20 to display the window 22A. Once it is determined at Step S30 that the second touch operation A2 is detected, the controller 10 causes the display section 20 to display the window 22B. Alternatively, once it is determined at Step S35 that the third touch operation A3 is detected, the controller 10 causes the display section 20 to display the window 22C. The window 22B displayed upon detection of the second touch operation A2 is different in size from the window 22A displayed upon detection of the first touch operation A1. Furthermore, the window 22C displayed upon detection of the third touch operation A3 is different in size from the window 22A displayed upon detection of the first touch operation A1 and the window 22B displayed upon detection of the second touch operation A2.

As described with reference to FIGS. 1-3, selection among the first, second, and third touch operations A1, A2, and A3 to the first icon 21 can result in size setting of the window 22 to be displayed on the display section 20. As a result, a size of the window 22 can be set by a simple user operation, thereby reducing a burden on the user in causing the display section 20 to display the window 22.

Figure 4A:
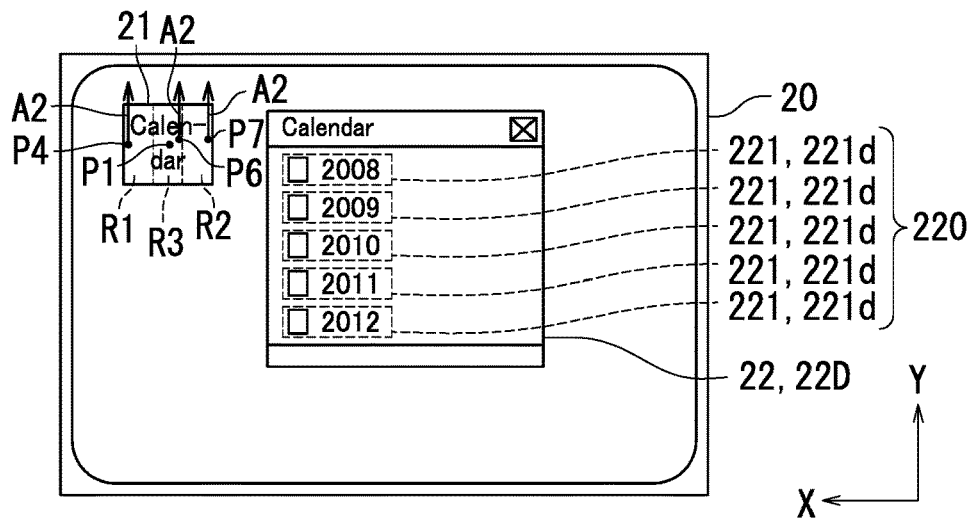
FIGS. 4A-4C illustrate second window display control that the display device according to the embodiment of the present disclosure executes.
Figure 4B:
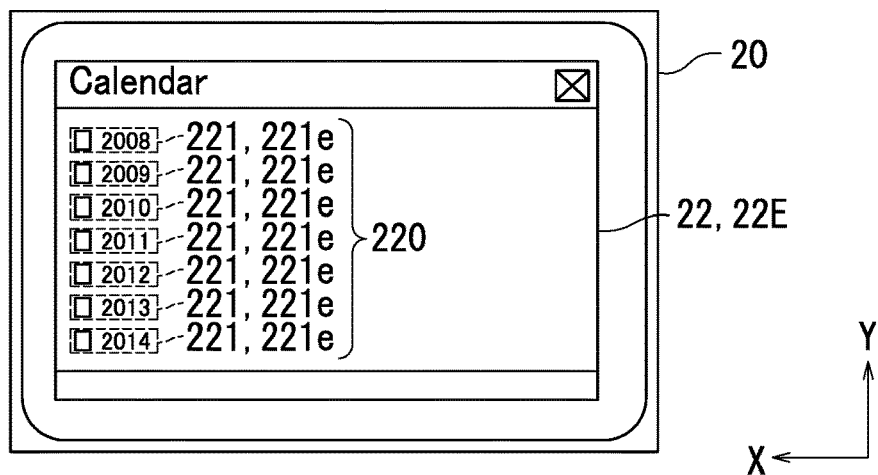
Figure 4C:
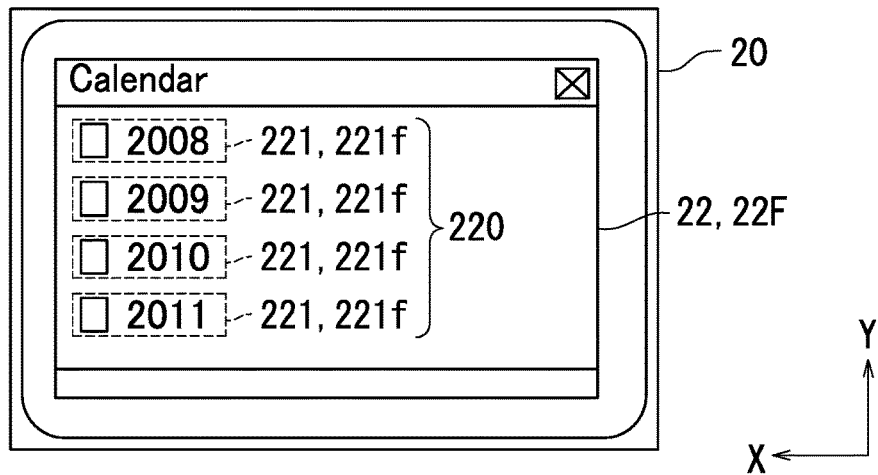

Second window display control that the display device 1 executes will be described next with reference to FIGS. 1 and 4A-4C. FIGS. 4A-4C illustrate second window display control that the display device 1 executes.

The window 22 includes symbols 221 representing respective second icons 220. The first icon 21 includes a plurality of regions. Size information pieces different from one another are associated with the respective regions. The size information pieces each indicate a size of the symbols 221. The controller 10 determines a size of the symbols 221 based on a size information piece associated with a region among the plurality of regions of the first icon 21 in which a starting position of the second touch operation A2 is located. A specific example will be described below.

As illustrated in FIG. 4A, the plurality of regions of the first icon 21 include a first region R1, a second region R2, and a third region R3. The first region R1 is located adjacent to the third region R3. The second region R2 is located adjacent to the third region R3. The third region R3 is located between the first and second regions R1 and R2. The first, second, and third regions R1, R2, and R3 each are associated with a corresponding one of the size information pieces different from one another.

The controller 10 causes the display section 20 to display a window 22 illustrated in FIG. 4A upon detection of the first touch operation A1. The window 22 displayed upon detection of the first touch operation A1 may be also referred to below as a window 22D. The window 22D has the preset size. Further, the size of the symbols 221 included in the window 22D has a preset size set in advance. The symbols 221 included in the window 22D may be referred to below as symbols 221d. The preset size of the window 22 herein refers to for example the number of pixels, an area, or a diagonal length of the window 22 that each are preset by a user.

The controller 10 causes the display section 20 to display a window 22 illustrated in FIG. 4B upon detection of the second touch operation A2 having a starting position P4 within the first region R1. The window 22 displayed upon detection of the second touch operation A2 having the starting position P4 within the first region R1 may be also referred to below as a window 22E. The controller 10 determines a size of the symbols 221 included in the window 22E based on a size information piece associated with the first region R1. The symbols 221 included in the window 22E may be also referred to below as symbols 221e.

A size that the size information piece associated with the first region R1 indicates is smaller than the size of the symbols 221d. That is, the symbols 221e included in the window 22E are smaller in size than the symbols 221d included in the window 22D.

The controller 10 causes the display section 20 to display a window 22 illustrated in FIG. 4C upon detection of the second touch operation A2 having a starting position P7 within the second region R2. The window 22 displayed upon detection of the second touch operation A2 having the starting position P7 within the second region R2 may be also referred to below as a window 22F. The controller 10 determines a size of the symbols 221 included in the window 22F based on a size information piece associated with the second region R2. The symbols 221 included in the window 22F may be referred to below as symbols 221f.

A size that the size information piece associated with the second region R2 indicates is larger than the size of the symbols 221d. That is, the symbols 221f included in the window 22F are larger in size than the symbols 221d included in the window 22D. Furthermore, the symbols 221f included in the window 22F are larger in size than the symbols 221e included in the window 22E.

A size that a size information piece associated with the third region R3 indicates is the preset size. In the above configuration, the controller 10 causes the display section 20 to display a window 22 larger in size than the window 22D upon detection of the second touch operation A2 having a starting position P6 located within the third region R3. The size of the symbols 221 included in the window 22 is the preset size.

As described with reference to FIGS. 1 and 4A-4C, a size of the symbols 221 is determined based on a size information piece associated with one of the regions of the first icon 21 in which a starting position of the second touch operation A2 is located in the present embodiment. In the above configuration, the user of the display device 1 can set a size of the symbols 221 included in the window 22 only by changing a starting position of the second touch operation A2 to the first icon 21. As a result, the window 22 is displayed on the display section 20 while a size of the symbols 221 included in the window 22 is set. This can reduce a burden on the user in causing the display section 20 to display the window 22.

The size of the symbols 221e that the size information piece associated with the first region R1 indicates is smaller than that of the symbols 221d included in the window 22D in the present embodiment. In the above configuration, the user of the display device 1 can cause the symbols 221e to be displayed in a size smaller than the preset size only by touching the first region R1 of the first icon 21 of the display section 20 as the starting position P1 of the second touch operation A2. This can enable simultaneous recognition of more symbols 221e than those displayed in the preset size.

Furthermore, the size of the symbols 221f that the size information piece associated with the second region R2 indicates is larger than that of the symbols 221d included in the window 22D in the present embodiment. In the above configuration, the user of the display device 1 can cause the symbols 221f to be displayed in a size larger than the preset size only by touching the second region R2 of the first icon 21 on the display section 20 as the starting position P1 of the second touch operation A2. This can improve recognizability of the symbols 221f when compared with a situation in which the symbols 221 are displayed in the preset size on the display section 20.

The size of the symbols 221 that the size information piece associated with the third region R3 indicates is the preset size in the present embodiment. In the above configuration, the user of the display device 1 can cause the window 22 to be displayed large without changing the size of the symbols 221 only by touching the third region R3 of the first icon 21 on the display section 20 as the starting position P6 of the second touch operation A2.

Figure 5A:
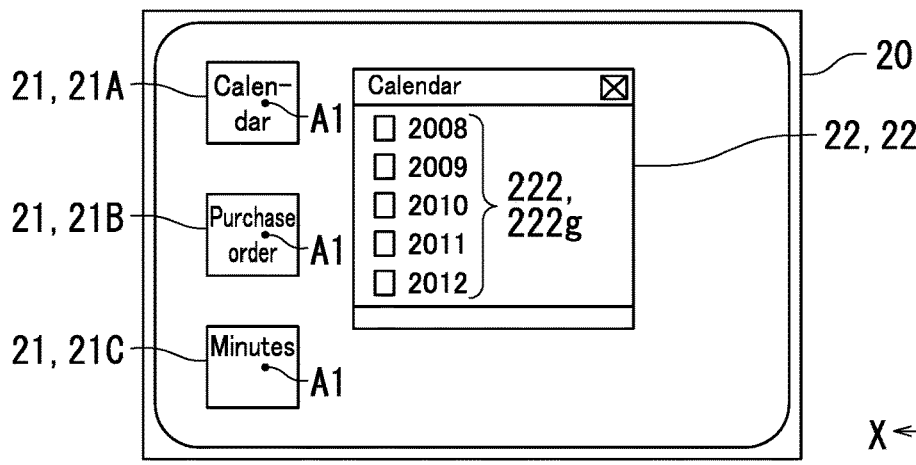
FIGS. 5A-5C illustrate third window display control that the display device according to the embodiment of the present disclosure executes.
Figure 5B:
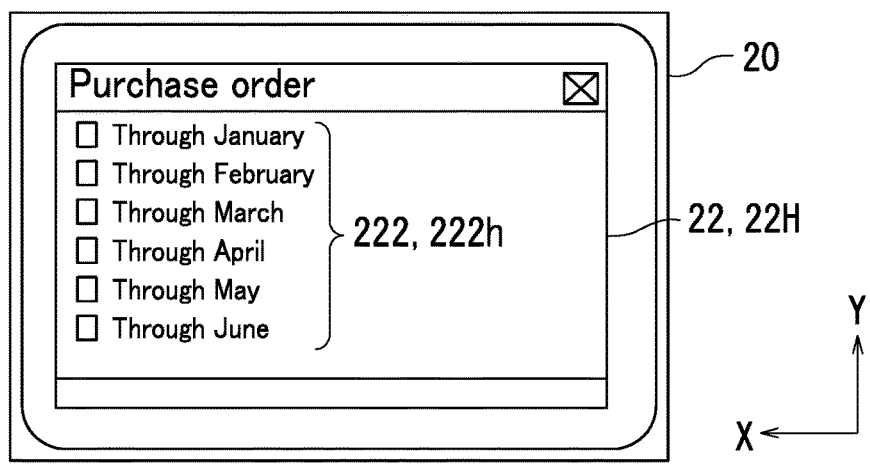
Figure 5C:
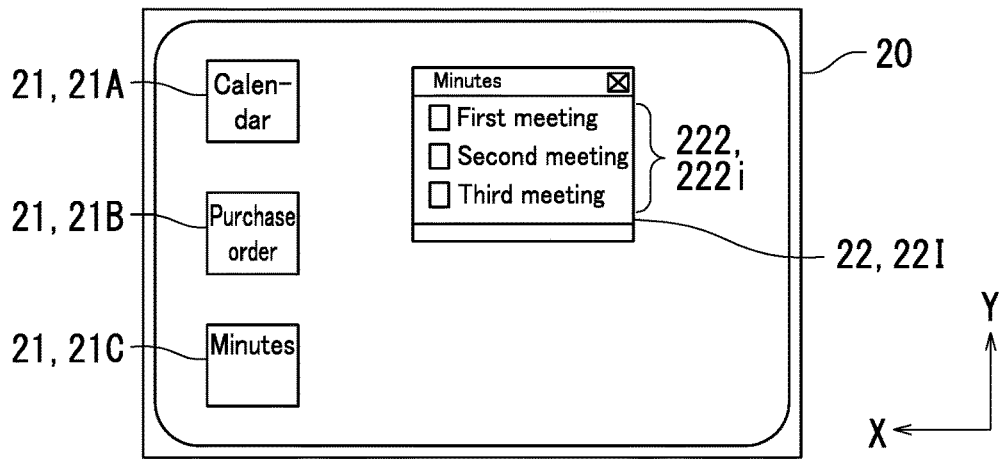

Third window display control that the display device 1 executes will be described next with reference to FIGS. 1 and 5A-5C. FIGS. 5A-5C illustrate the third window display control that the display device 1 executes.

The display section 20 in the present embodiment displays a plurality of first icons 21. Among the plurality of first icons 21, a first icon 21 including a symbol indicating "Calendar" may be also referred to below as a first icon 21A. A first icon 21 including a symbol indicating "Purchase order" among the plurality of first icons 21 may be also referred to below as a first icon 21B. Also, a first icon 21 including a symbol indicating "Minutes" among the plurality of first icons 21 may be also referred to below as a first icon 21C.

A folder of which folder name is "Calendar" is associated with the first icon 21A. Five second icons 222 are associated with the folder of which name is "Calendar". The second icons 222 associated with the folder of which folder name is "Calendar" may be also referred to below as second icons 222g. That is, the five second icons 222g are associated with the first icon 21A.

A folder of which folder name is "Purchase order" is associated with the first icon 21B. Six second icons 222 are associated with the folder of which name is "Purchase order". The second icons 222 associated with the folder of which folder name is "Purchase order" may be also referred to below as second icons 222h. That is, the six second icons 222h are associated with the first icon 21B.

A folder of which folder name is "Minutes" is associated with the first icon 21C. Three second icons 222 are associated with the folder of which name is "Minutes". The second icons 222 associated with the folder of which folder name is "Minutes" may be also referred to below as second icons 222i. That is, the three second icons 222i are associated with the first icon 21C.

Upon detection of the first touch operation A1 to any of the first icons 21, the controller 10 determines a size of the window 22 according to the number of the second icons 222 associated with the touched first icon 21. For example, size information pieces each corresponding to the number of the second icons 222 are stored in the storage 12 of the controller 10. Specifically, the smaller the number of the second icons 222 is, the smaller size a size information piece that the controller 10 causes the storage 12 to store in association therewith indicates. As such, the smaller the number of the second icons 222 associated with a first icon 21 is, the smaller the size of the window 22 that the controller 10 determines is.

Specifically, the controller 10 determines, upon detection of the first touch operation A1 to the first icons 21A, a size of the window 22G according to the number of the second icons 222g associated with the first icon 21A. The controller 10 determines, upon detection of the first touch operation A1 to the first icon 21B, a size of the window 22H according to the number of the second icons 222h. Furthermore, the controller 10 determines, upon detection of the first touch operation A1 to the first icon 21C, a size of the window 22I according to the number of the second icons 222i.

The number of second icons 222h associated with the first icon 21B is larger than that of the second icons 222g associated with the first icon 21A in the present embodiment. The window 22G is accordingly smaller in size than the window 22H. Further, the number of the second icons 222i associated with the first icon 21C is smaller than the number of the second icons 222g associated with the first icon 21A. The window 22G is accordingly larger in size than the window 22I.

As described above with reference to FIGS. 1 and 5A-5C, the controller 10 determines a size of the window 22 corresponding to a folder according to the number of the second icons 222 upon detection of the first touch operation A1. In the above configuration, a user who may not even grasp the numbers of second icons 222 associated with the respective folders can cause the display section 20 to display a window 22 in a size corresponding to the number of the second icons 222. As a result, a burden on the user can be reduced in causing the display section 20 to display the window 22.

Figure 6:
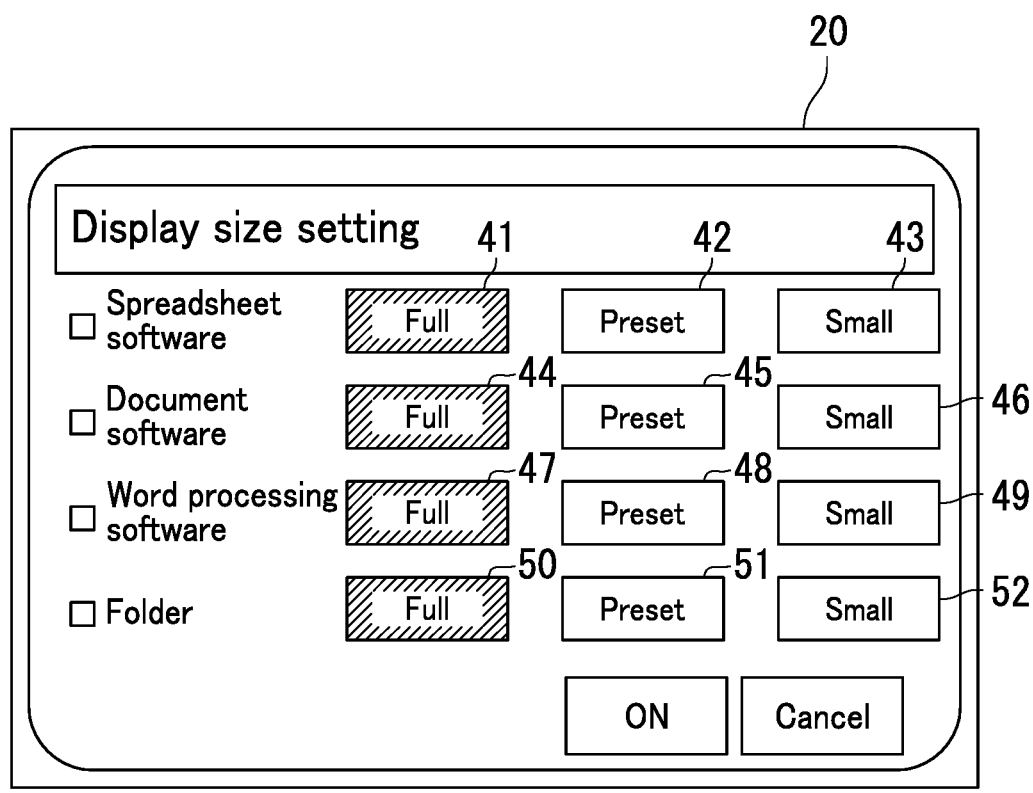
FIG. 6 illustrates a first setting screen that a display section of the display device according to the embodiment of the present disclosure displays.

Fourth window display control that the display device 1 executes will be described next with reference to FIGS. 1, 2A-2C, and 6. FIG. 6 illustrates a first setting screen that the display section 20 displays. Application software are associated with a first icon 21 in some cases. The application software is an application program for example that a computer executes. Examples of the application software include spreadsheet software, document software, and word processing software. A size information piece of the window 22 is associated with the application software. Upon detection of the first touch operation A1 in the first setting screen, the controller 10 determines a size of the window 22 corresponding to the application software based on the size information piece associated with the application software. A specific example will be described below.

As illustrated in FIG. 6, the first setting screen includes a plurality of buttons 41-52. When any one of the buttons 41-43 is selected, a size information piece of the window 22 is set to be associated with the spreadsheet software. Specifically, upon selection of the button 41, a size information piece that indicates a size of the window 22 when displayed full on the display section 20 is associated with the spreadsheet software. Alternatively, upon selection of the button 42, a size information piece that indicates a size of the window 22 when displayed on the display section 20 in the preset size is associated with the spreadsheet software. Further, upon selection of the button 43, a size information piece that indicates a size of the window 22 when displayed on the display section 20 in a size smaller than the preset size is associated with the spreadsheet software.

Selection of any one of the buttons 44-46 results in setting of a size information piece of the window 22 associated with the document software in a similar manner to that for the spreadsheet software. Also, selection of any one of the buttons 47-49 results in setting of a size information piece of the window 22 associated with the word processing software in a similar manner to that for the spreadsheet software.

Furthermore, a size information piece of the window 22 corresponding to folders associated with a first icon 21 can be set through the first setting screen. When any one of the buttons 50-52 is selected, a size information piece of the window 22 in displaying the window 22 corresponding to the folders is set in a similar manner to that for the spreadsheet software.

As described with reference to FIGS. 1, 2A-2C, and 6, the controller 10 in the present embodiment determines, upon detection of the first touch operation A1, a size of the window 22 corresponding to application software based on a size information piece associated with the application software. In the above configuration, the user can preset the preset size of the window 22 displayed on the display section 20. As a result, convenience to the user can be increased.

Furthermore, according to the present embodiment, the window 22 of which size is determined based on a size information piece associated with application software is displayed on the display section 20 upon detection of the first touch operation A1 and the displayed window 22 is changed in size upon detection of the second or third touch operation A2 or A3. In the above configuration, the user can set a size of the window 22 to be displayed on the display section 20 by selecting a touch operation to the first icon 21 from among the first to third touch operations A1, A2, and A3. As a result, a size of the window 22 can be set by simple user operation, thereby reducing a burden on the user in causing the display section 20 to display the window 22.

Figure 7:
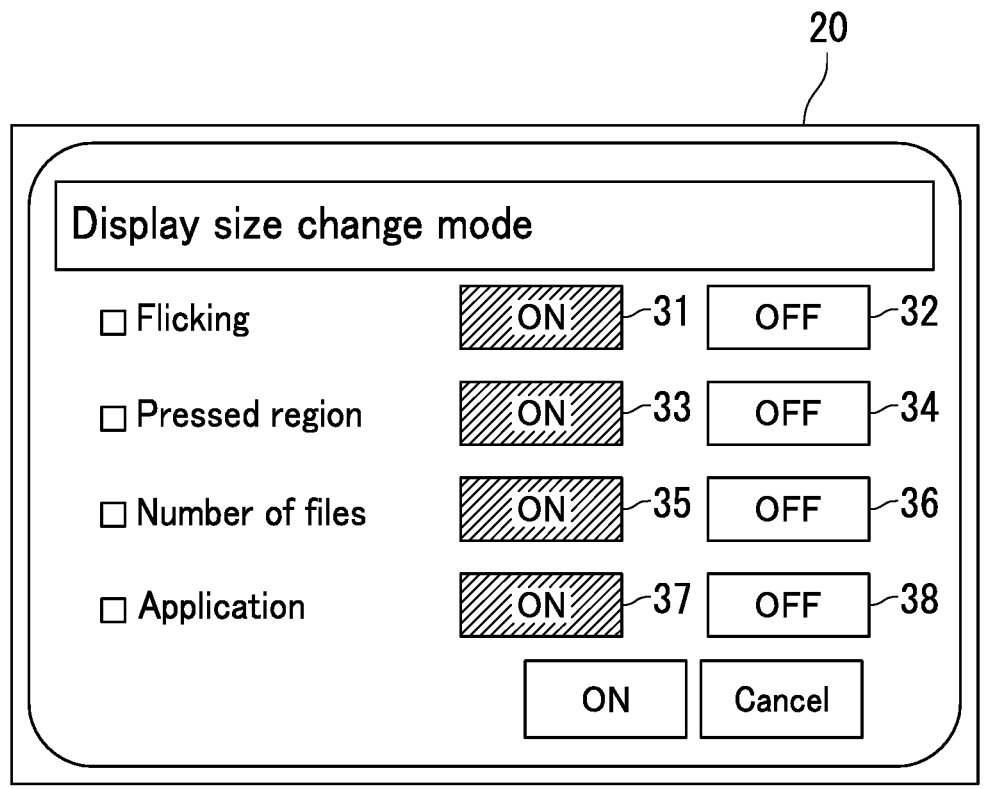
FIG. 7 illustrates a second setting screen that the display section of the display device according to the embodiment of the present disclosure displays.

Modes of window display control that the display device 1 adopts will be described next with reference to FIGS. 1, 2A-2C, and 4A-7. FIG. 7 illustrates a second setting screen that the display section 20 displays. As illustrated in FIG. 7, the display section 20 displays the second setting screen. The second setting screen includes a plurality of buttons 31-38. The controller 10 turns on the first window display control in response to a touch to the button 31. Specifically, upon selection of the button 31, the controller 10 turns on a display size change mode in which the size of the window 22 is changed according to detection of either of the second and third touch operations A2 and A3. That is, selection of the button 31 causes the controller 10 to control the display section 20 such that the window 22 displayed upon detection of either of the second and third touch operations A2 and A3 is different in size from the window 22 displayed upon detection of the first touch operation A1. The controller 10 turns off the first window display control in response to a touch to the button 32. In a situation in which the first window display control is turned off, the controller 10 controls the display section 20 such that the window 22 displayed upon detection of either of the second and third touch operations A2 and A3 is equal in size to the window 22 displayed upon detection of the first touch operation A1.

The controller 10 turns on the second window display control in response to a touch to the button 33. Specifically, selection of the button 33 causes the controller 10 to turn on a display size change mode in which the size of the symbols 221 is changed according to a starting position of either of the second and third touch operations A2 and A3. That is, through selection of the button 33, the controller 10 to determines a size of the symbols 221 based on a size information piece associated with a region among the plurality of regions of the first icon 21 in which a starting position of the second or third touch operation A2 or A3 is located. The controller 10 turns off the second window display control in response to a touch to the button 34. In a situation in which the second window display control is turned off, the controller 10 controls the display section 20 upon detection of either of the second and third touch operations A2 and A3 such that the symbols 221 in the preset size are included in the window 22.

The controller 10 turns on the third window display control in response to a touch to the button 35. Specifically, selection of the button 35 causes the controller 10 to turn on a display size change mode in which the window 22 is displayed in a size according to the number of associated files upon detection of the first touch operation A1. That is, through selection of the button 35, the controller 10 determines a size of the window 22 corresponding to a folder according to the number of the second icons 222 associated with the folder upon detection of the first touch operation A1. The controller 10 turns off the third window display control in response to a touch to the button 36. In a situation in which the third window display control is turned off, the controller 10 causes the display section 20 to display the window 22 in the preset size upon detection of the first touch operation A1.

The controller 10 turns on the fourth window display control in response to a touch to the button 37. Specifically, selection of the button 37 causes the controller 10 to turn on a display size change mode in which the window 22 is changed in size based on a size information piece associated with application software. That is, through selection of the button 37, the controller 10 determines a size of the window 22 corresponding to application software based on a size information piece associated with the application software upon detection of the first touch operation A1. The controller 10 turns off the fourth window display control in response to a touch to the button 38. In a situation in which the fourth window display control is turned off, the controller 10 causes the display section 20 upon detection of the first touch operation A1 to display the window 22 in the preset size without reference to the size information piece associated with any application software.

As has been described with reference to FIGS. 1, 2A-2C, and 4A-7, the size change modes can be turned on and off in the present embodiment. In the above configuration, a burden on the user can be reduced in causing the display section 20 to display the window 22.

An embodiment of the present disclosure has been described so far with reference to the drawings (FIGS. 1-7). However, the present disclosure is not limited to the above-described embodiment and can be practiced in various ways within the scope not departing from the essence of the present disclosure (for example, as described below in sections (1) and (3)). The drawings are schematic illustrations that emphasize elements of configuration in order to facilitate understanding thereof, and properties of elements of configuration illustrated in the drawings, such as thickness, length, and number thereof, may differ from actual properties thereof in order to facilitate preparation of the drawings. Shapes, dimensions, etc. of the elements of configuration given in the above embodiment are merely examples that do not impart any particular limitations and may be altered in various ways, so long as such alterations do not substantially deviate from the configuration of the present disclosure.

(1) As has been described with reference to FIGS. 1 and 4A-4C, a size of the symbols 221 is determined based on a size information piece associated with a region of the first icon 21 in which the starting position of the second touch operation A2 is located. Alternatively, however, the controller 10 may determine a size of the symbols 221 based on a size information piece associated with a region of the first icon 21 in which the starting position of the third touch operation A3 is located. In the above configuration, the window 22 in a size smaller than that of the window 22 displayed upon detection of the first touch operation A1 is displayed and a size of the symbols 221 is determined based on a size information piece associated with a region of the first icon 21 in which the starting position of the third touch operation A3 is located. For example, in a situation in which the starting position of the third touch operation A3 is located in the first region R1, the controller 10 controls the display section 20 such that the window 22 displayed upon detection of the third touch operation A3 is smaller in size than the window 22 displayed upon detection of the first touch operation A1. A size of the symbols 221 included in the window 22 is determined based on a size information piece associated with the first region R1.

(2) As has been described with reference to FIGS. 1 and 5A-5C, the controller 10 determines a size of the window 22 based on a size information piece stored in the storage 12 and the number of second icons 222 upon detection of the first touch operation A1 to the first icon 21. Alternatively, the controller 10 may cause the display section 20 to display the window 22 in a size large enough for all the second icons 220 to be concurrently displayed without need to zoom up or scroll the window 22. In causing the display section 20 to display the window 22 as above, the controller 10 may control the display section 20 to display the window 22 in a further reduced size.

(3) As has been described with reference to FIGS. 1 and 2A-2C, the controller 10 causes the display section 20 to display the window 22 while setting the size of the window 22 upon detection of any of the first, second, and third touch operations A1, A2, and A3. Alternatively, the controller 10 may control the display section 20 such that the window 22 is changed in size upon the touch panel 30 detecting a fourth touch operation to the window 22 after the display section 20 displays the window 22. The fourth touch operation includes continuous touch of the detection target to the window 22 displayed on the display section 20 for a predetermined time period or more followed by travel of the detection target on the display section 20. Specifically, when the detection target presses long the window 22 displayed on the display section 20 and then performs a dragging on the display section 20, the controller 10 may control the display section 20 to display the window 22 changed in size in response to the dragging.

What is claimed is:
1. A display device comprising:
a display section configured to display a first icon;
a detection section configured to detect a first touch operation and a second touch operation to the first icon, the second touch operation being different from the first touch operation; and
a controller configured to control the display section, wherein
the first icon is a single stationary icon,
the first touch operation and the second touch operation each are a touch operation by a detection target,
the controller includes:
a storage that stores a program therein; and
a processor configured to control the display section through execution of the program,
the controller
causes the display section to display a window associated with the first icon upon detection of either of the first and second touch operations, and
controls the display section such that a window displayed upon detection of the second touch operation is different in size from a window displayed upon detection of the first touch operation,
the window includes symbols,
the first icon includes a plurality of regions,
size information pieces different from one another are associated with the respective plurality of regions of the first icon,
the size information pieces each indicate a size of the symbols, and
the controller determines a size of the symbols based on a size information piece associated with a region of the plurality of regions of the first icon in which a starting position of the second touch operation is located,
wherein the display section displays a setting screen,
the setting screen includes a first button and a second button,
in response to detection of the second touch operation upon selection of the first button, the controller determines a size of the symbols based on the size information piece associated with the region in which the starting position of the second touch operation is located, and controls the display section to include the symbols for which the size has been determined in the window,
in response to detection of the second touch operation upon selection of the second button, the controller controls the display section to include the symbols having the preset size in the window.
2. The display device according to claim 1, wherein the second touch operation includes travel of the detection target on the display section in a first direction starting from the first icon as a starting point,
the detection section detects a third touch operation to the first icon,
the third touch operation is different from the first and second touch operations and includes travel of the detection target on the display section in a second direction starting from the first icon as a starting point,
the second direction is different from the first direction, and
the controller
controls the display section such that the window displayed upon detection of the second touch operation is larger in size than the window displayed upon detection of the first touch operation, and
controls the display section such that a window displayed upon detection of the third touch operation is smaller in size than the window displayed upon detection of the first touch operation.

3. The display device according to claim 1, wherein the plurality of regions of the first icon includes a first region and a second region, a size that a size information piece associated with the first region indicates is smaller than a size of the symbols included in the window displayed upon detection of the first touch operation, and a size that a size information piece associated with the second region indicates is larger than the size of the symbols included in the window displayed upon detection of the first touch operation.

4. The display device according to claim 1, wherein application software is associated with the first icon,
a size information piece of a window is associated with the application software, and
upon detection of the first touch operation, the controller determines a size of the window corresponding to the application software based on the size information piece associated with the application software.

5. The display device according to claim 1, wherein
a folder is associated with the first icon,
one or more second icons are associated with the folder, and
upon detection of the first touch operation, the controller determines a size of a window corresponding to the folder according to the number of the one or more second icons.

6. The display device according to claim 3, wherein
the plurality of regions of the first icon further includes a third region located between the first and second regions, and
a size that a size information piece associated with the third region indicates is a preset size of the symbols.

7. The display device according to claim 5, wherein the smaller the number of the one or more second icons associated with the folder is, the smaller a size of a window that the controller determines is.

8. A display method that a display device including a display section implements, the method comprising:
displaying a first icon;
detecting either of a first touch operation and a second touch operation to the first icon, the second touch operation being different from the first touch operation;
causing the display section to display a window associated with the first icon upon detection of either of the first and second touch operations, wherein
the first icon is a single stationary icon,
the first touch operation and the second touch operation each are a touch operation by a detection target,
a window displayed upon detection of the second touch operation is different in size from a window displayed upon detection of the first touch operation,
the window includes symbols,
the first icon includes a plurality of regions,
size information pieces different from one another are associated with the respective plurality of regions of the first icon,
the size information pieces each indicate a size of the symbols, and
the controller determines a size of the symbols based on a size information piece associated with a region of the plurality of regions of the first icon in which a starting position of the second touch operation is located,
wherein the display section displays a setting screen,
the setting screen includes a first button and a second button,
in response to detection of the second touch operation upon selection of the first button, the controller determines a size of the symbols based on the size information piece associated with the region in which the starting position of the second touch operation is located, and controls the display section to include the symbols for which the size has been determined in the window,
in response to detection of the second touch operation upon selection of the second button, the controller controls the display section to include the symbols having the preset size in the window.

9. The display device according to claim 5, wherein
the second touch operation includes travel of the detection target on the display section from the first icon as a starting point,
the regions that the first icon includes each have a rectangular shape, and the first direction is parallel to a longitudinal direction of the rectangular shape.

10. The display device according to claim 1, wherein the detection target is a finger of a user or a stylus.

* * * * *